(12) United States Patent
Takeuchi et al.

(10) Patent No.: US 8,334,068 B2
(45) Date of Patent: Dec. 18, 2012

(54) LAMINATE BATTERY WITH DEFORMATION RESTRICTING MEMBER

(75) Inventors: Tomoyasu Takeuchi, Aichi-ken (JP); Yoshiaki Ebine, Aichi-ken (JP); Makoto Nakashima, Toyota (JP); Satoshi Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1154 days.

(21) Appl. No.: 11/587,861

(22) PCT Filed: Apr. 21, 2005

(86) PCT No.: PCT/JP2005/008110
§ 371 (c)(1),
(2), (4) Date: Oct. 27, 2006

(87) PCT Pub. No.: WO2005/106988
PCT Pub. Date: Nov. 10, 2005

(65) Prior Publication Data
US 2007/0231685 A1   Oct. 4, 2007

(30) Foreign Application Priority Data
Apr. 28, 2004   (JP) ................... 2004-132843

(51) Int. Cl.
*H01M 2/02* (2006.01)
*H01M 2/06* (2006.01)

(52) U.S. Cl. ........ 429/163; 429/136; 429/139; 429/162; 429/179

(58) Field of Classification Search ............... 429/136, 429/139, 162, 163
See application file for complete search history.

(56) References Cited

U.S. PATENT DOCUMENTS
2003/0064286 A1* 4/2003 Yoshida et al. ............... 429/184
2004/0036444 A1* 2/2004 Oogami ........................ 320/110
2004/0038125 A1* 2/2004 Kim et al. ..................... 429/162

FOREIGN PATENT DOCUMENTS
EP     1 184 914 A1    3/2002
(Continued)

OTHER PUBLICATIONS
Supplementary European Search Report dated Dec. 19, 2007.

*Primary Examiner* — Keith Walker
(74) *Attorney, Agent, or Firm* — Finnegan, Henderson, Farabow, Garrett & Dunner, LLP (57) ABSTRACT

An electrode terminal 42 is connected to a current collector part 12 of electrodes through a deformation restricting member 3. Between laminate films 2 and 2, a space 15 is formed above and below the current collector part 12. The deformation restricting member 3 is placed close to the inner wall peripheral portion of an outer package including sealing parts 23, thereby forming a deformation-restricting part 22 to restrict the inward deformation of the laminated films 2. In a section extending from the inside end of the deformation restricting member 3 to a battery element 1, the laminated films 2 face the space 15 to allow the deformation of the laminated films 2 in response to the change of internal pressure. At the decrease of internal pressure, the contraction of the laminated films 2 can be localized in the deformation-allowing part 21, thereby reducing the bending stress on an end portion of the sealing parts 23. Thus, the laminate type secondary battery and the battery pack thereof can be provided with the effect that the concentration of stress on the bonded part of the laminated films can be suppressed even when the expansion and contraction of the laminated films are repeated in response to the change of internal pressure of the laminated films bonded to hermetically accommodate the battery element.

11 Claims, 8 Drawing Sheets

FOREIGN PATENT DOCUMENTS

| | | |
|---|---|---|
| JP | 2000-200584 | 7/2000 |
| JP | 2001-195475 | 7/2000 |
| JP | 2000195475 A * | 7/2000 |
| JP | 2000-277066 | 10/2000 |
| JP | 2001-057190 | 2/2001 |
| JP | 2001-196035 | 7/2001 |
| JP | 2004-234899 | 8/2004 |
| JP | 2004-288571 | 10/2004 |
| JP | 2004-355915 | 12/2004 |
| WO | WO 99/19919 | 4/1999 |

* cited by examiner

LAMINATE BATTERY WITH DEFORMATION RESTRICTING MEMBER

TECHNICAL FIELD

The present invention relates to a secondary battery to be mounted in vehicles and more particularly to a secondary battery with a laminated film having high durability which accommodates a battery element.

BACKGROUND ART

Battery packs disclosed in Patent Documents 1 and 2 are power sources for use in portable information technology devices, such as a cellular phone and a mobile computer. The battery back has such a structure that a power generating element such as lithium ion is accommodated in an outer package made of an aluminum laminated film (a laminated sheet), constituting a secondary battery, and the secondary battery is housed in a plastic outer case (pack case). This configuration is to prevent the outward expansion or the change of outline of the outer case (pack case) when the outer package expands due to the increased internal pressure of the secondary battery.

In Patent Document 1, the flat outer case made of synthetic resin has openings on both sides of the case in the direction of thickness and metal plates are stuck on the sides to cover the openings respective so that the outward expansion of the battery body is released inside the openings.

In Patent Document 2, a pack case housing a secondary battery is provided with space formation parts between the secondary battery and the case, forming spaces between the inner wall of the case and the secondary battery. When the outer package made of a laminated sheet expands due to the generation of gas, the expansion of the outer package is released inside the space formation part, thereby preventing the change in the outline of the pack case.

A secondary battery disclosed in Patent Document 3 is a lithium secondary battery to be used as a battery for portable electronics or personal computers. This battery is adapted to prevent breakage of a battery element covered with a flexible synthetic-resin film.

In the secondary battery disclosed in Patent Document 3, a rigid retainer is placed in contact with the sides of a battery element, and the outer faces of the battery element are covered with the flexible synthetic-resin film. This is to prevent a load on the battery element during a process of covering the battery element with the synthetic-resin film or during use, and thus prevent damages or short circuits in the battery element.

The above mentioned prior art documents are as listed below.

Patent Document 1: Jpn. unexamined patent publication No. 2001-196035 (paragraphs [0002]-[0008])
Patent Document 2: Jpn. unexamined patent publication No. 2001-57190 (paragraphs [0002]-[0008])
Patent Document 3: Jpn. unexamined patent publication No. 2000-195475 (paragraphs [0002]-[0008], [0041])

Patent Documents 1 and 2 mentioned above relate to the battery pack comprising the secondary battery in which the battery element is accommodated in the outer package such as a laminated film and further housed in the pack case for use. This battery pack, in which the pack case has the openings or the space formation part, may absorb the expansion of the outer package resulting from the increased internal pressure of the secondary battery so that the pack case does not expand or become deformed when pressed by the expanded outer package.

However, films of the laminated film outer package for accommodating the battery element are bonded by heat welding or another technique to enclose the battery element. While the film outer package repeatedly expands and contracts according to the internal pressure, the supporting point for deformation at the expansion and contraction is the bonded part. Accordingly, bending stress would constantly be concentrated on the bonded part. In the film bonded part, especially, the stress is likely to be concentrated on a discontinuous portion having a stepped structure or the like, e.g., a portion through which an electrode terminal protrudes outside, an explosion-proof working part having lower bonding strength than the bonded part except for such working part and serving as a safety valve in case of excessive internal pressure, and the like.

In Patent Documents 1 and 2 mentioned above, the film outer package facing the openings or the space formation part could freely expand and contract. However, there is no disclosure about the position of the openings or space formation part in the pack case. If these openings or space formation part exist in the bonded part of the film outer package, the stress resulting from the expansion and contraction will repeatedly be exerted on the bonded part. If the openings or space formation part exist in the bonded part having discontinuity for the electrode terminal, the explosion proof working part, or the like, the stress concentration caused by the expansion and contraction would be further increased. This may cause fatigue failure in the bonded part of the laminated film.

In aforementioned Patent Document 3, the retainers are placed in contact with the sides of the battery element inside the synthetic-resin film, so that damages to the battery element can be prevented. However, there is no disclosure about the relief of stress concentration on the bonded part of the synthetic-resin film resulting from the expansion and contraction of the film, and therefore the retainer does not seem to serve to relieve the stress. Thus, the stress when repeatedly applied may cause fatigue failure in the film.

The present invention has been made to solve at least one of the above problems and has a purpose to provide a laminate type secondary battery in which a battery element is accommodated in a sealed outer package made of laminated films, the secondary battery being capable of suppressing the concentration of stress on a bonded part of the laminated films even if expansion and contraction are repeated in response to the change of internal pressure, and to provide a battery pack thereof.

DISCLOSURE OF INVENTION

To achieve the above purpose, a laminate type secondary battery comprising: an outer package formed of laminated films having end portions which are at least partly bonded together to form a bonded part; and a battery element hermetically accommodated in the outer package, the battery comprising: a deformation-restricting part which includes a deformation restricting member placed close to an inner wall of the outer package including the bonded part to restrict the deformation of the laminated film resulting from expansion and contraction of the outer package; and a deformation-allowing part which is arranged apart from the bonded part and allow the deformation of the laminated film resulting from the expansion and contraction of the outer package.

In the laminate type secondary battery of the present invention, the laminated film is formed in a bag shape having a bonded part as at least part of end portions and serves as an outer package accommodating the battery element in a sealed state. The deformation restricting member is placed close to the inner wall of the outer package including the bonded part. This deformation restricting member restricts deformation of the laminated film at the expansion and contraction of the outer package. The deformation of the laminated film is allowed in the deformation-allowing part arranged away from the bonded part.

The bonded part of the laminated films is formed by adhesively joining, heat welding, or other techniques. Accordingly, there are generally discontinuity in structure at the boundary between the bonded part and a non-bonded part and discontinuity in bonding condition such as a bonding position and bonding strength in the bonded part. The deformation-allowing part allows the deformation of the laminated film locally in an area apart from the bonded part, while the deformation restricting part restricts the deformation of the laminated film in and around the bonded part. Thus, the part having the structural discontinuity, such as the bonded part and its surrounding portions, can be prevented from becoming deformed. Further, the concentration of bending stress on the structural discontinuous part such as the bonded part can be relieved. This makes it possible to avoid fatigue failure, e.g., cracks, in the laminated film resulting from the bending stress, thus preventing the occurrence of liquid leakage or the like.

At this time, the bonded part of the laminated film preferably includes an electrode bonded part in which the laminated films are bonded to an electrode terminal. In the part of the laminated film through which the electrode terminal protrudes outside, the electrode terminal is bonded to the film. The electrode bonded part, which includes a stepped structure corresponding to the thickness of the electrode terminal, has discontinuity in structure. The deformation of the laminated film including the electrode bonded part can be restricted and therefore the concentration of the bending stress on the electrode bonded part can be suppressed.

Further, a current collector part may be provided for connecting each electrode of the battery element to the electrode terminal. In this case, preferably, the deformation-restricting part is provided in a section extending from the electrode bonded part and including at least part of the current collector part, and the deformation-allowing part is provided in a section extending from the battery element and including at least part of the current collector part.

In the current collector part, the electrodes extending from the battery element are collected toward the electrode terminal, so that a space widening toward the electrode terminal may be generated in the outer package. When the deformation-allowing part is provided in the section extending from the battery element and including at least part of the current collector part and the deformation-restricting part is provided in the section including at least part of the current collector part and the electrode bonded part. Accordingly, the deformation of the electrode bonded part can be restricted while the laminated film is allowed to be deformed by use of the space around the current collector part.

Further, the deformation-restricting part may be provided in a section extending from the electrode bonded part to the battery element through the current collector part. Further, the deformation restricting member may be provided with at least one of an opening, a cutout part, and a recessed part to form the deformation-allowing part.

Here, the deformation restricting member is preferably made of an electrically insulating member such as a resinous member. This makes it possible to prevent electric conduction between electrodes in the outer package. For instance, the configuration that the electrodes in the current collector part are covered with the deformation restricting member can prevent electric conduction between the electrodes through an inner-layer metal film of the laminated film.

In the case where the battery pack is structured by stacking the above mentioned laminate type secondary batteries, a spacer may be placed between adjacent batteries, forming a shock-absorbing space between the adjacent batteries. Accordingly, the deformation of the laminated film in the deformation-allowing part will not interfere with the next battery.

BEST MODE FOR CARRYING OUT THE INVENTION

A detailed description of a preferred embodiment of a laminate type secondary battery and a battery pack thereof embodying the present invention will now be given referring to the accompanying drawings; FIGS. 1 through 8.

Figure 1:
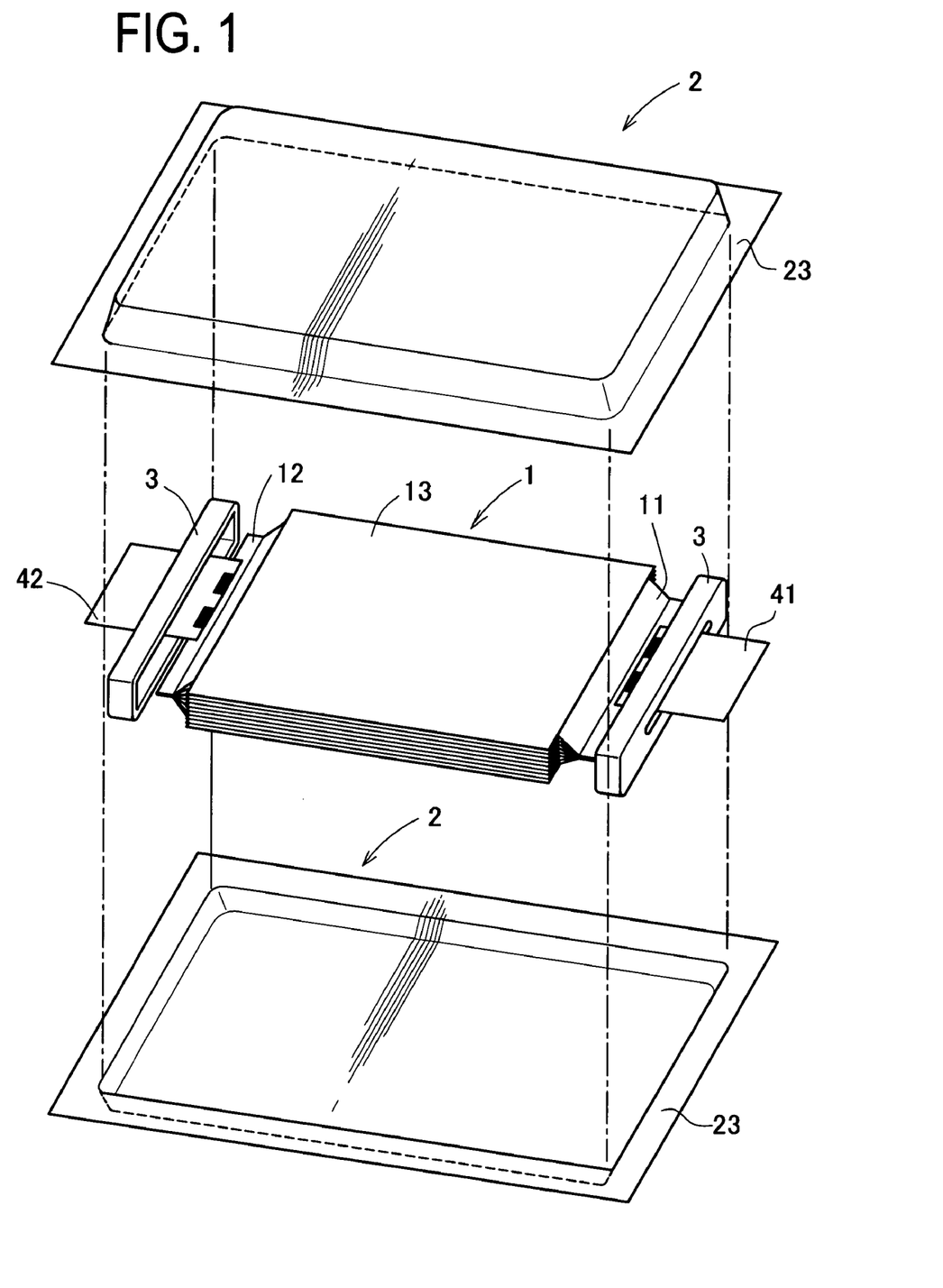
FIG. 1 is an exploded perspective view showing a structure of a laminate type secondary battery in an embodiment.
Figure 2:
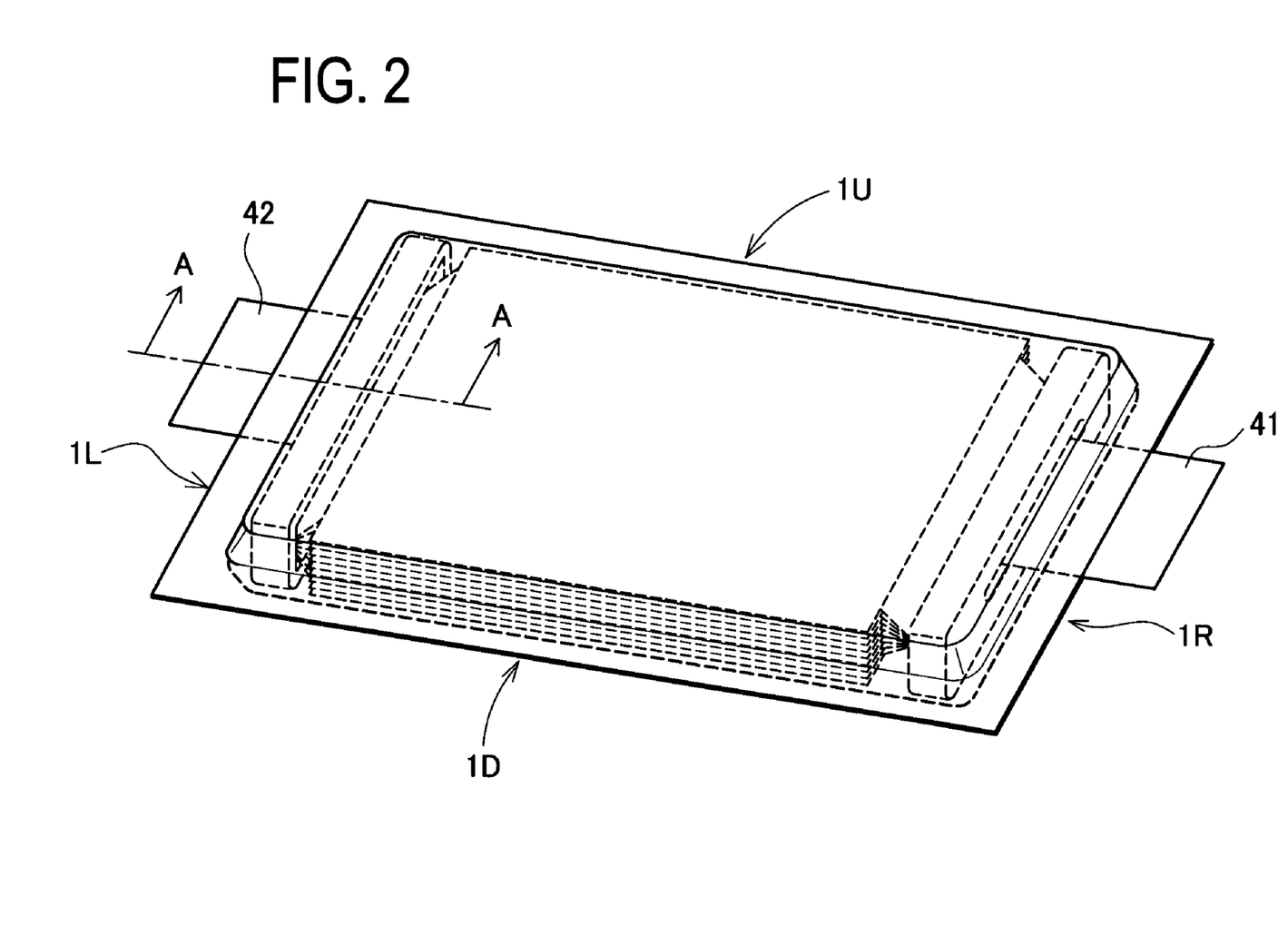
FIG. 2 is a perspective view showing the structure of the laminate type secondary battery in the embodiment.

As shown in FIGS. 1 and 2, in the laminate type secondary battery in the present embodiment, a battery element 1 is hermetically accommodated in an outer package made of laminated films 2. The battery element 1 includes positive electrode plates each of which is made of a metallic foil in film shape applied with a positive active material over the surface thereof and negative electrode plates each of which is made of a metallic foil in film shape applied with a negative active material over the surface thereof so that the positive and negative electrode plates are alternately stacked with separators made of resinous porous film, interposed therebetween.

The battery element 1 has such a configuration that rectangular cell elements are laminated in a multilayer form or long lengths of a cell element wound in a multilayer form is shaped in a rectangle and laminated one on top of the other. The rectangular laminated battery element 1 includes an active material formation part 13 at the center there of and metal-film exposed parts applied with no positive/negative active material at both side ends of stripe shape, which form positive and negative electrodes. The positive/negative electrodes are formed at respective ends of the cell elements laminated in a multilayer form and bounded into one and connected to a flat positive terminal 41 or a flat negative terminal 42 for extracting a positive or a negative electrode from the battery element 1 as a laminate type secondary battery. This bounded areas are current collector parts 11 and 12. The battery element 1 is connected to the positive terminal 41 and the negative terminal 42 through the electrodes bounded by polarity in the current collector parts 11 and 12. The battery element 1 is hermetically accommodated in an outer package made of laminated films 2 and 2.

Each of the laminated films 2 and 2 constituted by an external surface made of nylon and an internal surface made of polypropylene, laminated with an aluminum film interposed therebetween. Each film 2 has a sealing part 23 at the periphery and is formed in a flat-bottomed cup shape having the depth about half the thickness of the battery element 1 to cover the upper or lower rectangular surfaces of the battery element 1. The films 2 and 2 are put together from above and below the battery element 1, and the sealing parts 23 are adhesively joined or heat welded to bond the laminated films 2 and 2 to hermetically accommodate the battery element 1.

Prior to hermetically accommodating the battery element 1, the positive and negative electrode terminals 41 and 42 and the current collector parts 11 and 12 are protected by the deformation restricting members 3 and 3. Each deformation restricting member 3 is formed suitable for the width and thickness of the battery element 1. The deformation restricting member 3 is configured in outer convex form and provided with a slit through which each electrode terminal 41, 42 is allowed to protrude, and an interior concave part for receiving the connected part of the electrode terminal and each of the current collector parts 11, 12, and also the current collector parts 11 and 12.

In the outer package, near the inner wall peripheral portion including the sealing parts 23 at which the laminated films 2 and 2 are bonded together, the side edges of the laminated battery element 1 are disposed along edges 1U and 1D with no electrode terminals 41 and 42 and the outer end faces of the deformation restricting members 3 and 3 are disposed along edges 1R and 1L through which the electrode terminals 41 and 42 protrude outside. Thus, the inward deformation of the laminated films 2 and 2 can be prevented at the peripheral portion including the sealing parts 23.

Figure 3:
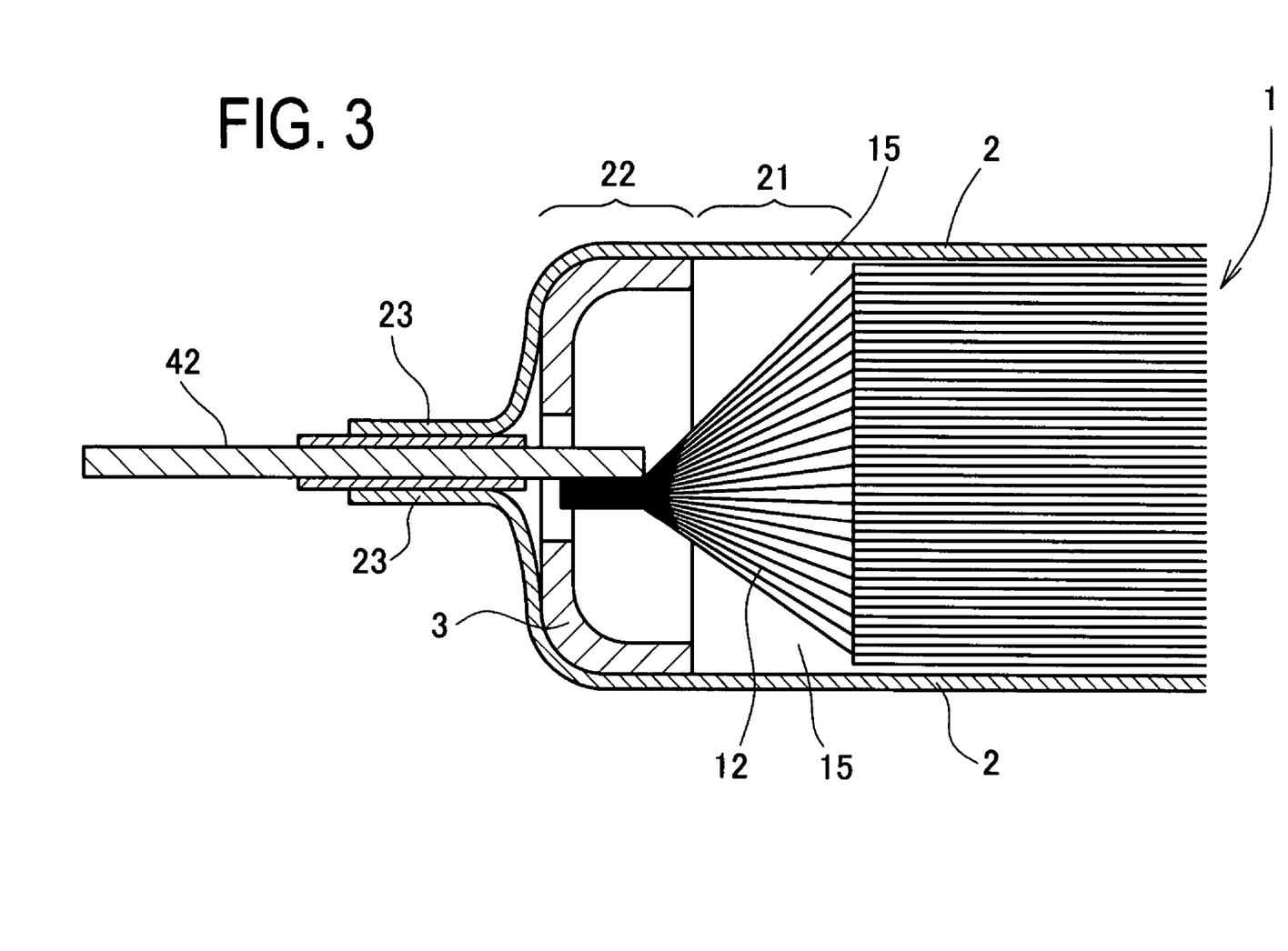
FIG. 3 is a sectional view of the battery taken along a line A-A of FIG. 2.

FIG. 3 is a sectional view of the secondary battery taken along a line A-A of FIG. 2. The electrode terminal 42 is inserted in the deformation restricting member 3 through the slit thereof and is connected to each electrode extending from the edge of the laminated battery element 1 through the current collector part 12. The sealing parts 23 of the laminated films 2 and 2 are bonded to both surfaces of the electrode terminal 42.

The electrode terminal 42 is positioned at substantially the center in a direction of the thickness of the battery element 1. Accordingly, the electrodes are collected from the layers to the center and there connected to the electrode terminal 42. Spaces 15 and 15 are therefore generated above/below the current collector part 12 within the laminated films 2 and 2. The deformation restricting member 3 exists close to the inner wall peripheral portion of the outer package including the sealing parts 23, so that the laminated films 2 are separated from the space 15, forming a deformation-restricting part 22 for restricting inward deformation of the laminated films 2.

The width of the deformation-restricting part 22 is determined according to the depth of the deformation restricting member 3. In FIG. 3, the deformation restricting member 3 is disposed in a section from the sealing part 23 to the middle of the space 15 extending to the end of the battery element 1, thus forming the deformation-restricting part 22. In a section from the inside end of the deformation restricting member 3 to the battery element 1, the laminated films 2 face the space 15 and therefore be deformable according to the changes of internal pressure. In this section, a deformation-allowing part 21 is provided.

Figure 4A:
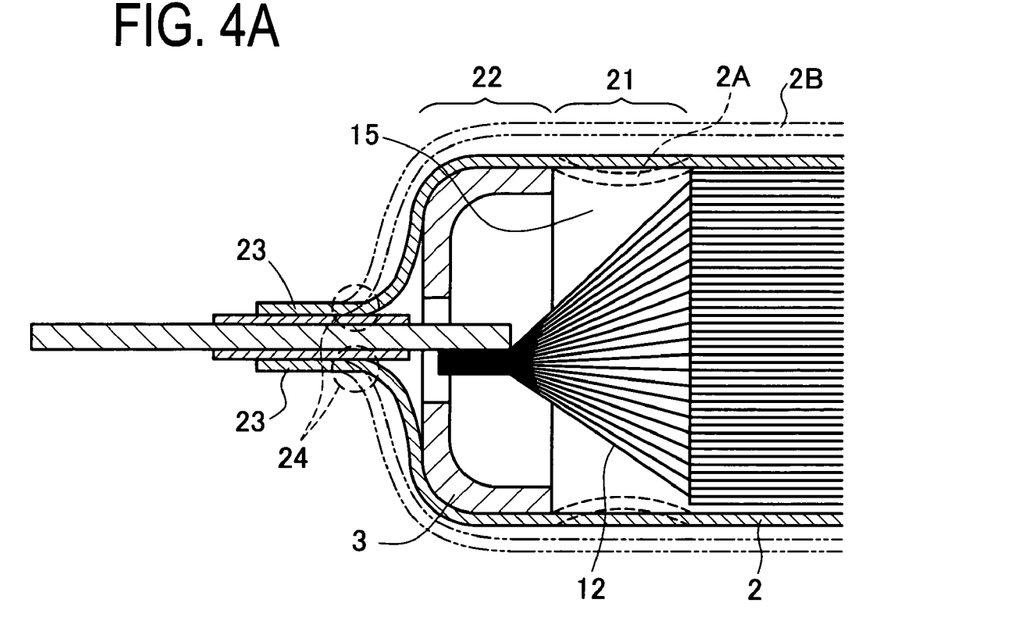
FIG. 4A is an explanatory view showing deformation of the laminated film in response to the change of internal pressure in the embodiment.
Figure 4B:
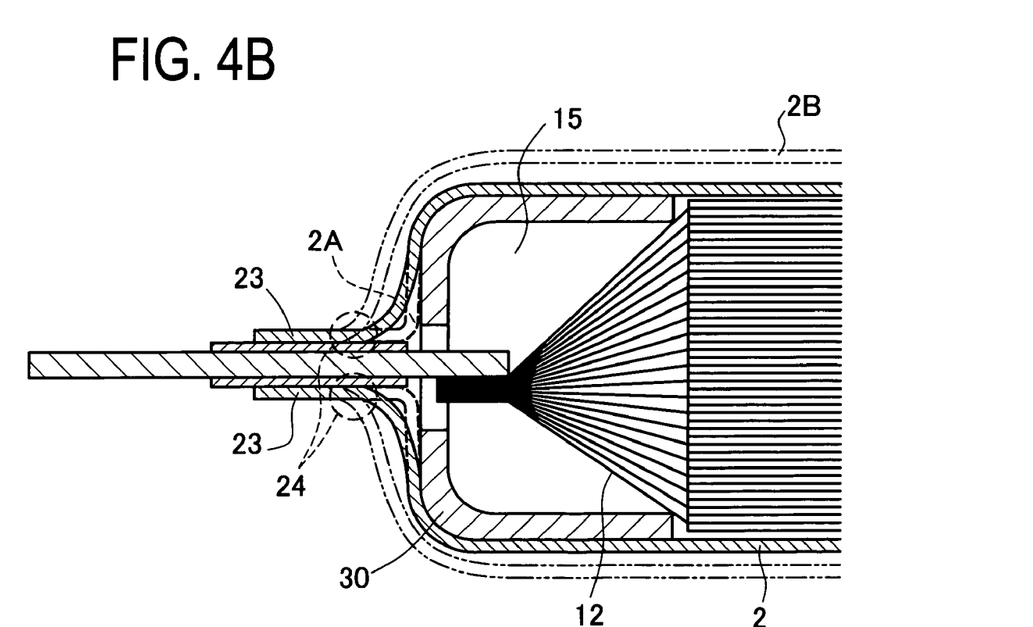
FIG. 4B is an explanatory view showing deformation of a laminated film in response to the change of internal pressure in a comparative example.

FIG. 4A shows the operations and effects of the deformation-allowing part 21 and the deformation-restricting part 22 in the present embodiment, showing comparison with a comparative example shown in FIG. 4B.

In the present embodiment shown in FIG. 4A, the space 15 is provided above and below the current collector part 12. The deformation-restricting part 22 is arranged as a section extending from the sealing parts 23 to the middle of the space 15, and the deformation-allowing part 21 is arranged as a section extending from the middle of the space 15 to the battery element 1. The internal pressure is directly exerted on the laminated films 2 existing in the deformation-allowing part 21. Therefore, decreasing of the internal pressure will cause the inward contraction of the laminated films 2 in the deformation-allowing part 21 (as illustrated by "2A" in FIG. 4A). On the other hand, the laminated films 2 existing in the deformation-restricting part 22 continuous from the sealing parts 23 are prevented from contracting. At the decrease of internal pressure, accordingly, the laminated films 2 are allowed to locally contract in the deformation-allowing part 21. The possible deformation of the laminated with in the comparative example, thus preventing fatigue failure of the laminated films 2 such as cracks or the like. Consequently, liquid leakage caused by the cracks can be avoided.

In order to sufficiently restrain the contraction of the laminated film 2 at the end portion 24 of the sealing part 23 at the decrease of internal pressure, it is effective to determine a clearance between the deformation restricting member 3 and each laminated film 2 within a predetermined range. If this clearance is determined in a range of 0 mm to about 3 mm, the contraction of the laminated films 2 can be restrained. If about 0.01 mm to about 1 mm, furthermore, the contraction of the laminated films 2 can be restrained more reliably.

On the other hand, the comparative example of FIG. 4B shows the case where a deformation restricting member 30 covers the entire space 15. The deformation of the laminated films 2 caused at the increase of internal pressure is similar to that in the embodiment shown in FIG. 4A. The laminated films 2 will expand (as illustrated by "2B" in FIG. 4B). At the decrease of internal pressure, to the contrary, the laminated films 2, which has no deformation-allowing part in the comparative example, contract in a small space existing between the deformation restricting member 30 and the sealing parts 23 (as illustrated by "2A" in FIG. 4B). Due to expansion and contraction of the laminated films 2, the bending stress will be applied on the end portions 24 of the sealing parts 23, causing cracks or the like in the film.

In the present embodiment the deformation of the laminated films 2 at the decrease of internal pressure can be localized. Even where the internal pressure repeatedly increases and decreases, the bending stress which will be applied on the end portions 24 can be reduced as compared with in the comparative example, thus preventing fatigue failure of the laminated films 2 such as cracks or the like. Consequently, liquid leakage caused by the cracks can be avoided.

Figure 5:
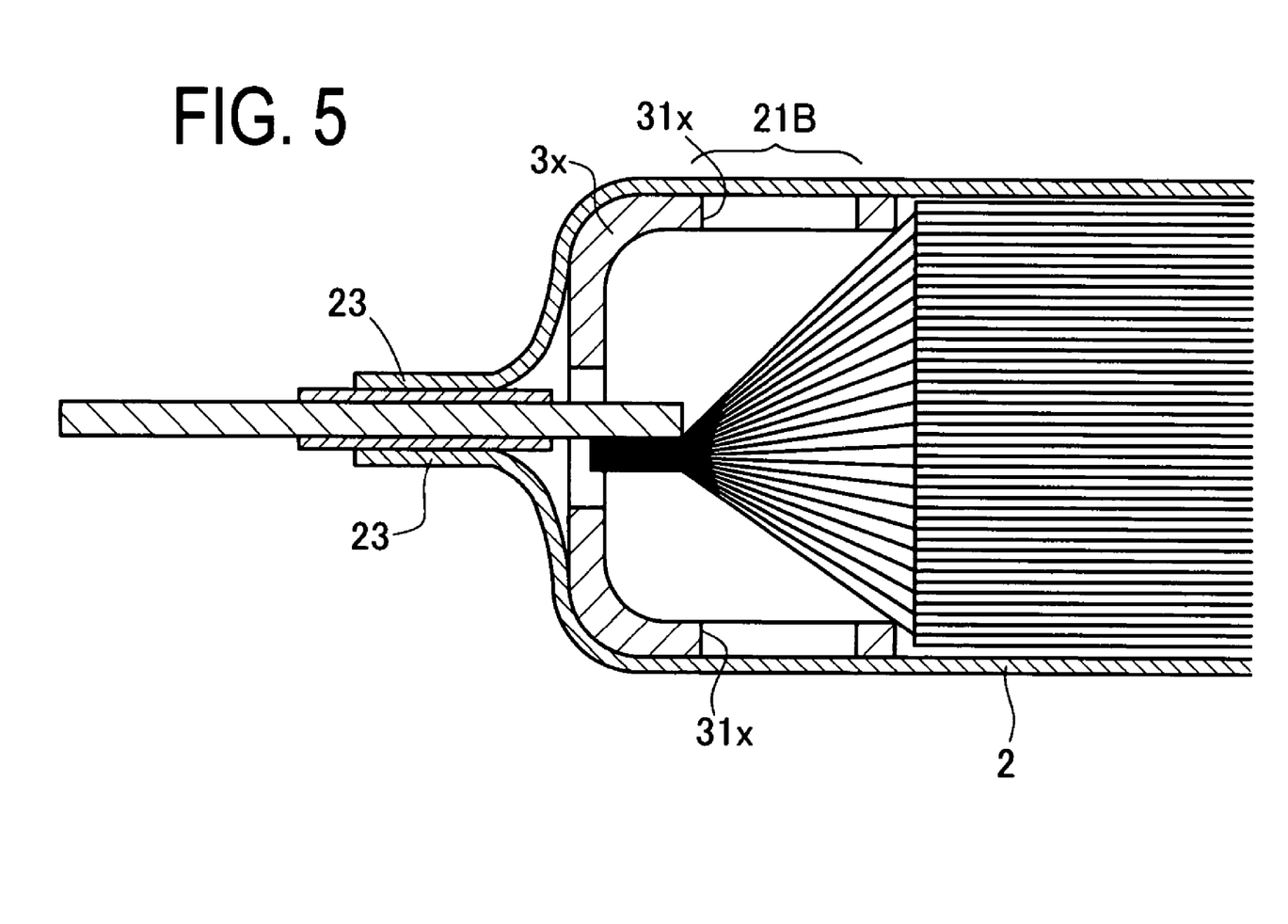
FIG. 5 is a view showing a first modification of a deformation-allowing part.
Figures 6A, 6B, 6C:
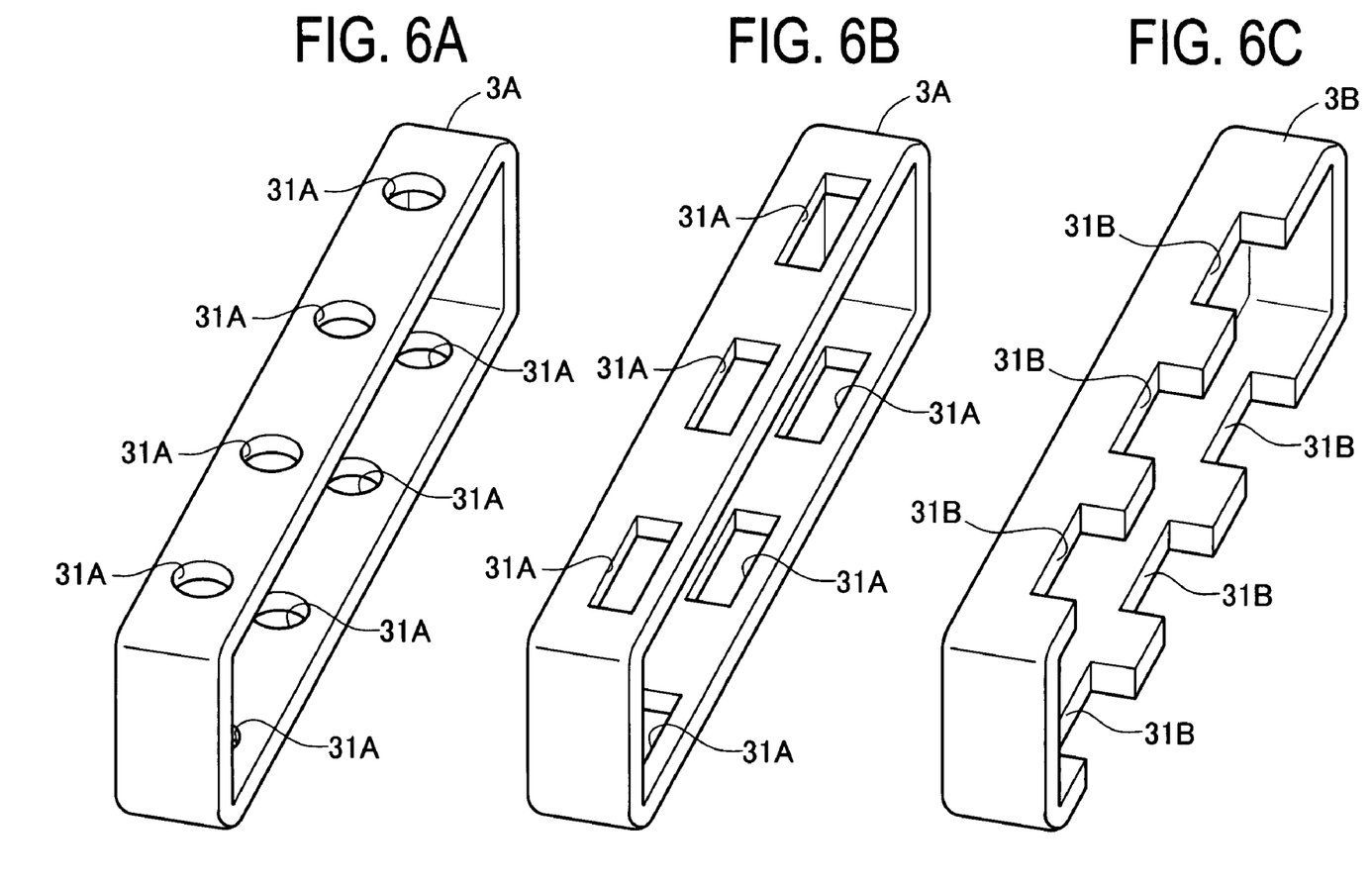
FIGS. 6A to 6C are views showing concrete examples of a deformation restricting member used in FIG. 5.
Figure 7:
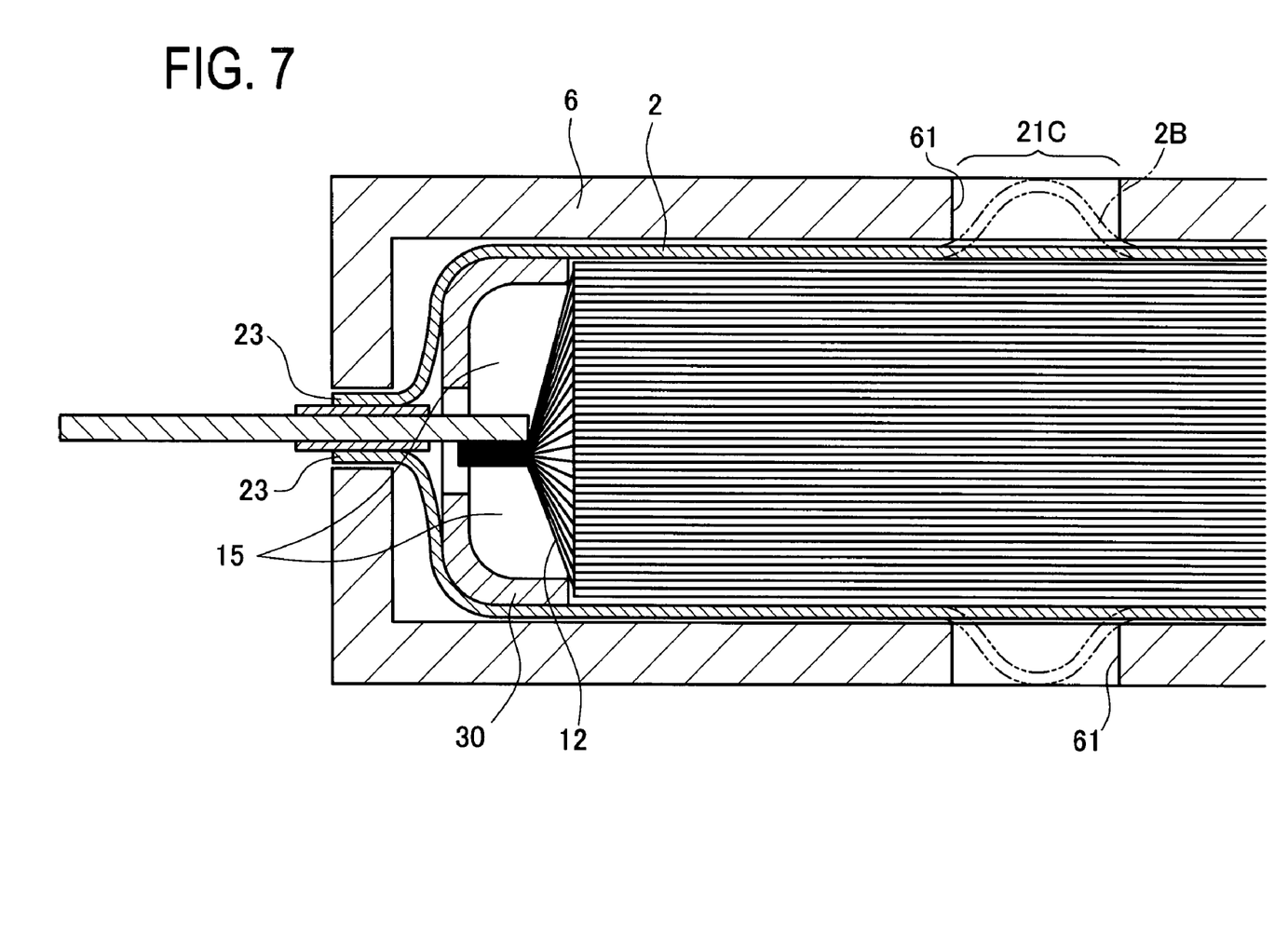
FIG. 7 is a view showing a second modification of the deformation-allowing part.

Modified embodiments of the deformation-allowing part are shown in FIGS. 5 to 7. FIG. 5 shows a case of a deformation restricting member 3x, which has openings 31x and 31x at positions apart from the sealing parts 23 to provide a deformation-allowing part 21B. This configuration can realize the deformation restricting member 3x having the depth of the interior concave part enough to completely cover the space 15 extending from the sealing parts 23 to the battery element 1. The contraction areas of the laminated films 2 at the decrease of internal pressure are localized in the openings 31x. Accordingly, the bending stress on the films 2 at the sealing parts 23 can be reduced. Further, the laminated films 2 are supported by the deformation restricting member 3x, so that the laminated films 2 can be prevented from becoming broken due to external force including impacts such as drops.

FIGS. 6A to 6C show concrete examples of the deformation restricting member 3x. In FIGS. 6A and 6B, each deformation restricting member 3A has openings 31A. The shape of each opening 31A is circular in FIG. 6A and rectangular in FIG. 6B. Irrespective of each shape, the openings 31A can serve as the deformation-allowing part.

FIG. 6C, a deformation restricting member 3B has cutouts 31B instead of openings. FIG. 6C shows the case where the rectangular cutouts 31B are formed, which also can serve as the deformation-allowing part irrespective of the shape.

FIG. 7 shows a configuration example that the battery element hermetically accommodated in the laminated films 2 is housed in a battery case 6. In this configuration, the deformation restricting member 30 is provided to cover the space 15 existing above and below the current collector part 12 and extending from the sealing parts 23 to the battery element. Instead of providing the deformation-allowing part utilizing the space 15, the battery case 6 is formed with openings 61 and 61 above the rectangular surfaces of the battery element, providing deformation-allowing parts 21C and 21C. Accordingly, the laminated films 2 are allowed to be deformed outwardly in the openings. The expansive deformation of the laminated films 2 at the increase of internal pressure can be localized in the deformation-allowing parts 21C. Thus, the deformation of the laminated films 2 at the sealing parts can be suppressed at the increase of internal pressure, with the result of reduction in bending stress thereon.

Figure 8:
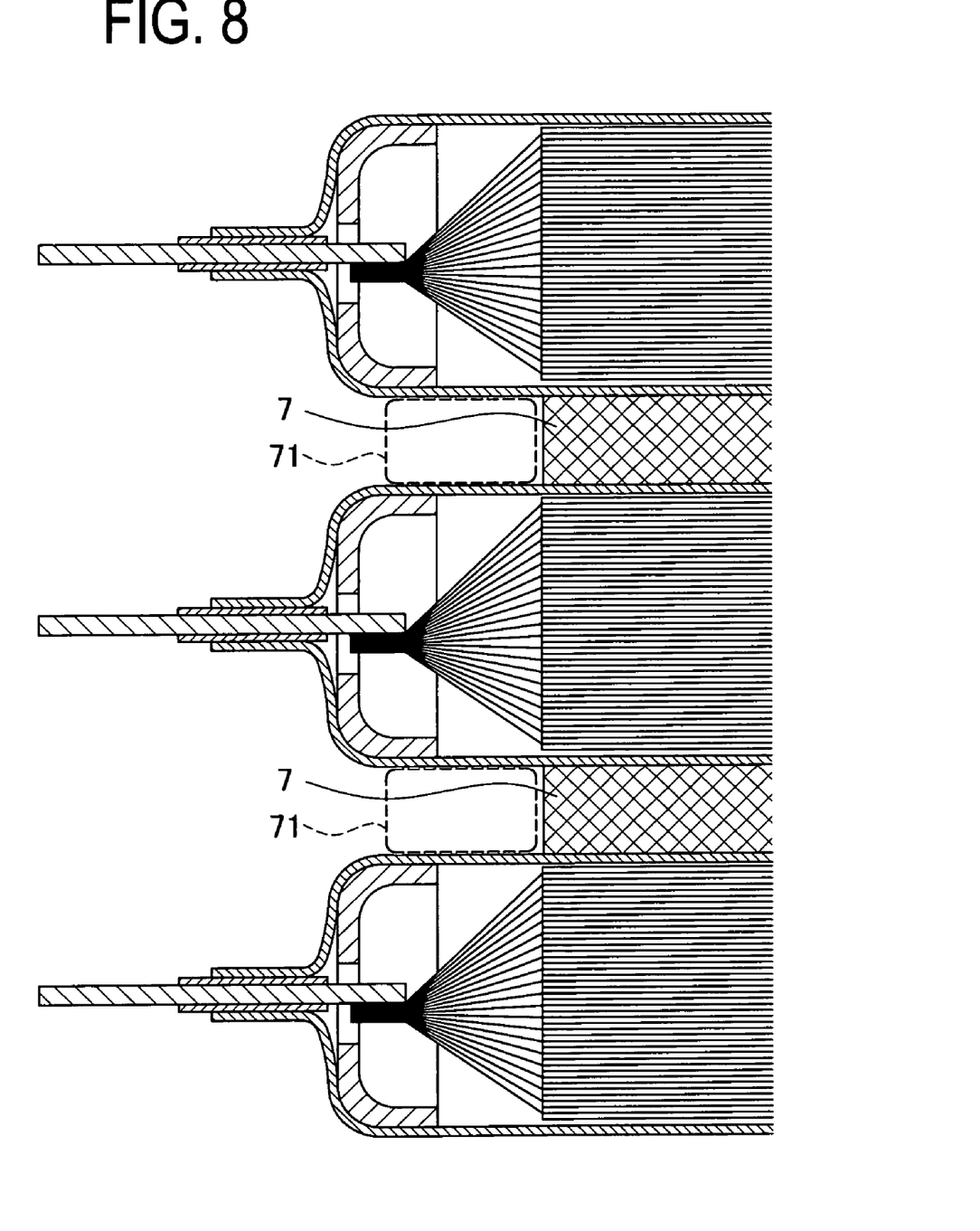
FIG. 8 is a schematic view of a battery pack including the secondary battery in the embodiment.

FIG. 8 is a schematic view showing the arrangement of the aforementioned laminate type secondary batteries as a battery pack. A spacer 7 is interposed between adjacent batteries to form a shock-absorbing space 71 so that the adjacent batteries have no influence on each other when the laminated films 2 of each battery are deformed in the deformation-allowing parts. This is an effective structure in the case where, the laminated films 2 for each battery element are allowed to expand only in the deformation-allowing part at the increase of internal pressure. It is to be noted that the spacer 7 may be provided with openings or recesses corresponding to the openings 61 shown in FIG. 7.

The laminate type secondary battery has heretofore been used in the field of household electric appliances and, in recent years, increasingly used for various areas beyond the field of such household electric appliances, that is, for an in-vehicle battery for hybrid electric vehicles, pure electric vehicles, or the like, of which urgent development toward the practical use has been needed. In the field of vehicles, there is a demand for reliability in severe use environments including a wider range of ambient temperatures than that in the field of household electric appliances. It is thus conceivable that the internal pressure of the secondary battery may largely change depending on the ambient temperatures varying in the wider range, leading to the large variation width of expansion and contraction of the laminated films. In this view, the laminate type secondary battery in the present embodiment may be used as the in-vehicle battery. The deformation of the laminated films such as expansion and contraction can be localized in the deformation-allowing parts even when the internal pressure changes largely according to the ambient temperatures varying in a wide range. This makes it possible to prevent the concentration of bending stress on the sealing parts of the laminated films. Further, the fatigue failure of the laminated films such as cracks can be avoided and therefore liquid leakage resulting from such cracks can be prevented. The laminate type secondary battery suitable for use in the field of vehicles demanding the reliability in severe use environments including the wider ambient temperature range can be provided.

The deformation restricting members 3, 3x, 3A, 3B, and 30 are preferably made of materials resistant to electrolyte and electrically insulating. Such materials also have to be resistant to the electrolyte containing ethylene carbonate, diethylene carbonate, or a mixed solution thereof as a solvent, so that the quality of material can remain unchanged without e.g., swelling. Each of the deformation restricting members 3, 3x, 3A, 3B, and 30 is placed between the electrode and the laminated films. It is therefore necessary to take measures to prevent the electrodes from becoming electrically conducted with each other through the metallic film such as the aluminum film forming the middle layer of the laminated film even when the film forming the internal surface of the laminated film 2 peels off, exposing the metallic film. It is effective to make the deformation restricting member out of the electrical insulating materials.

The materials having the above properties may include polypropylene (PP), polyethylene (PE), polyphenylene sulfide (PPS), polytetrafluoroethylene (PTFE), or other resin materials.

In the laminate type secondary battery in the present embodiment and the battery pack thereof, as explained above in detail, the laminated film 2 is provided, at its edge, with the sealing part 23 as one example of a bonded part or an electrode bonded part. The sealing parts 23 are bonded together or to the electrode terminals 41 and 42, forming the laminated films 2 in a bag shape to serve as the outer package hermetically accommodating the battery element 1. The deformation restricting member 3 is placed close to the inner wall of the outer package including the sealing parts 23, providing the deformation-restricting part 22 which restricts the deformation of the laminated films 2 due to the expansion and contraction of the outer package. The deformation of the laminated films 2 is allowed in the deformation-allowing part 21 apart from the sealing parts 23.

In general, the laminated film 2 is discontinuous in structure at the boundary between a bonded part formed of the sealing part 23 and a non-bonded part except for the sealing part 23, and further the sealing part 23 also has discontinuity in bonding state such as bonding position and bonding strength. Therefore, the deformation-allowing part 21 localizes and allows the deformation of the laminated films 2 in a position apart from the sealing parts 23. The deformation-restricting part 22 restricts the deformation of the laminated films 2 at the sealing parts 23. Thus, the deformation of the films 2 at the structural discontinuous portions such as the sealing parts 23 and its surroundings can be suppressed, whereby reducing the concentration of the bending stress on the discontinuous portions. This makes it possible to avoid fatigue failure of the laminated films 2 such as cracks resulting from the bending stress, preventing the occurrence of liquid leakage or the like.

The deformation restricting member 3 is placed in the portion of the laminated films 2 through which the electrode terminal 41 or 42 protrudes outside. Thus, the restricting member 3 can restrict the deformation of the laminated films 2 including the structural discontinuous portion having a stepped portion for the thickness of the electrode terminal 41 or 42.

Further, the deformation-restricting part 22 is provided in the section extending from the sealing parts 23 and including at least part of the current collector part 12. The deformation-allowing part 21 is provided in the section extending from the battery element 1 and including at least part of the current collector part 12. The deformation of the laminated films 2 is allowed by utilization of the space 15 existing above and below the current collector part 12, while the deformation of the sealing parts 23 can be restricted. The deformation restricting member 3A may have openings 31A or the deformation restricting member 3B may have cutouts 31B to provide the deformation-allowing part 21B. The laminated films 2 are thus allowed to be deformed inwardly. The contraction of the laminated films 2 at the decrease of internal pressure can therefore be localized in the deformation-allowing part 21 or 21B.

In the case where the battery element hermetically accommodated in the laminated films 2 is to be housed in the battery case 6, the battery case 6 may be formed with openings 61 to provide the deformation-allowing part 21C. This allows the outward deformation of the laminated films 2, thus localizing the expansion of the laminated films 2 at the increase of internal pressure in the deformation-allowing part 21C.

In the case where the above mentioned laminate type secondary batteries are stacked to construct the battery pack, the shock-absorbing space 71 is provided between adjacent batteries, so that the deformation of the laminated films 2 in the deformation-allowing part will not cause interference between the adjacent batteries.

The present invention may be embodied in other specific forms without departing from the spirit or essential characteristics thereof.

For instance, in the present embodiment, the explanations are made on the case where each deformation restricting member 3, 3x, 3A, 3B, and 30 is disposed along the portion of the sealing parts 23 through which the electrode terminal 42 protrude outside. The present invention is not limited thereto and of course is effective if the deformation restricting member is disposed along the portion of the laminated films 2 on which the bending stress tends to concentrate at the expansion and contraction caused by the increased and decreased internal pressure.

The above explanations are made on the case where the deformation restricting member 3A or 3B is formed with the openings 31A or the cutouts 31B to provide the deformation-allowing part. However, the deformation-allowing part does not have to be formed as an open area and may be formed as a recess in the deformation restricting member.

Moreover, the deformation restricting members 3, 3x, 3A, 3B, and 30 and/or the openings 61 may be appropriately combined to provide a plurality of the deformation-allowing parts 21, 21B, and 21C, thereby localizing the deformable portions of the laminated films 2.

INDUSTRIAL APPLICABILITY

According to the present invention, it is possible to provide the laminate type secondary battery, with the battery element hermetically accommodated in the laminated films serving as the outer package, capable of suppressing the deformation of the laminated films including the bonded part for airtight accommodation, resulting from the expansion and contraction caused by the change of internal pressure, so that the concentration of stress on the bonded part of the laminated films can be reduced, and also to provide the battery pack.

The invention claimed is:

1. A laminate type secondary battery comprising:
   an outer package formed of laminated films having end portions which are at least partly bonded together to form a bonded part;
   a battery element hermetically accommodated in the outer package;
   a deformation-restricting part which includes a deformation restricting member, the deformation-restricting part being placed apart from the battery element and close to an inner wall of the outer package including the bonded part to restrict the deformation of the laminated film resulting from expansion and contraction of the outer package; and
   a deformation-allowing part which is arranged apart from the bonded part and between a portion of the deformation restricting part and the battery element and which allows the deformation of the laminated film resulting from the expansion and contraction of the outer package;
   wherein the deformation-allowing part is also arranged between the bonded part and the battery element;
   wherein the deformation-allowing part is further arranged such that the deformation-allowing part is located either between the deformation-restricting part and the battery element, or both between the deformation-restricting part and the battery element and in the deformation-restricting member and
   wherein the deformation-restricting member is not fixed to the outer package.

2. The laminate secondary battery according to claim 1, wherein the bonded part includes an electrode bonded part in which the laminated films are bonded to an electrode terminal.

3. The laminate secondary battery according to claim 1 further comprising a current collector part for connecting each electrode of the battery element to the electrode terminal,
   wherein the deformation-restricting part is provided in a section extending from the electrode bonded part and including at least part of the current collector part.

4. The laminate secondary battery according to claim 2 further comprising a current collector part for connecting each electrode of the battery element to the electrode terminal,
   wherein the deformation-allowing part is provided in a section extending from the battery element and including at least part of the current collector part.

5. The laminate secondary battery according to claim 3, wherein the deformation-restricting part is provided in the section extending from the electrode bonded part to the battery element through the current collector part, and
   the deformation restricting member is provided with at least one of an opening, a cutout, and a recess to form the deformation-allowing part.

6. The laminate secondary battery according to claim 1, wherein the deformation restricting member is made of an electrically insulating member.

7. The laminate type secondary battery according to claim 1, wherein the deformation restricting member is made of a resinous member.

8. The laminate type secondary battery according to claim 1, wherein a distance between the deformation restricting member and the inner wall of the outer package is preferably 0 mm to 3 mm.

9. The laminate secondary battery according to claim 8, wherein the distance between the deformation restricting member and the inner wall of the outer package is further preferably 0.01 mm to 1 mm.

10. A battery pack including the laminate secondary batteries according to claim 1 in a stacked relation, comprising:
a spacer provided between adjacent ones of the batteries to form a shock-absorbing space therebetween to prevent interference between the adjacent batteries by the deformation of the laminated film at the deformation-allowing part.

11. The laminate secondary battery according to claim 4, wherein the deformation-restricting part is provided in the section extending from the electrode bonded part to the battery element through the current collector part, and
the deformation restricting member is provided with at least one of an opening, a cutout, and a recess to form the deformation-allowing part.

* * * * *